(12) United States Patent
Goluguri (10) Patent No.: US 10,748,423 B2
(45) Date of Patent: Aug. 18, 2020

(54) PROXIMITY-BASED VEHICLE TAGGING (71) Applicant: TOYOTA MOTOR NORTH AMERICA, INC., Plano, TX (US)

(72) Inventor: Jaya Bharath R. Goluguri, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/201,119

(22) Filed: Nov. 27, 2018

(65) Prior Publication Data
US 2020/0168088 A1    May 28, 2020

(51) Int. Cl.
*G08G 1/127* (2006.01)
*H04W 4/44* (2018.01)
*G06K 9/00* (2006.01)

(52) U.S. Cl.
CPC .............. *G08G 1/127* (2013.01); *H04W 4/44* (2018.02); *G06K 9/00791* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 6,392,564 B1 | 5/2002 | Mackey et al. | |
| 7,624,024 B2* | 11/2009 | Levis | G06Q 10/08 705/1.1 |
| 8,452,481 B2* | 5/2013 | Ishiko | B60T 17/221 701/30.4 |
| 9,767,689 B1 | 9/2017 | Cain et al. | |
| 10,002,394 B1 | 6/2018 | Owens et al. | |
| 2002/0111844 A1* | 8/2002 | Vanstory | G06Q 10/06 705/7.13 |
| 2007/0282519 A1* | 12/2007 | Emam | G08G 1/017 701/117 |
| 2009/0233631 A1 | 9/2009 | Butler, Sr. et al. | |
| 2011/0320492 A1 | 12/2011 | Inghelbrecht | |
| 2017/0046952 A1 | 2/2017 | Yang et al. | |

* cited by examiner

*Primary Examiner* — John F Mortell
(74) *Attorney, Agent, or Firm* — Haynes and Boone, LLP (57) ABSTRACT

A system for tagging a vehicle generally includes a vehicle comprising a vehicle identification module comprising a user input processing module configured to receive an initiation communication comprising a data set that includes both target vehicle identifying data and target vehicle status information. The target vehicle status information includes at least an operative defect of a target vehicle. The system comprises a vehicle location database comprising identification information of a plurality of potential target vehicles. The system comprises a server comprising a server validation module configured to: interrogate the vehicle location database for the identification information; and identify the target vehicle of the plurality of potential target vehicles based on the target vehicle identifying data. The server comprises a recipient determination module configured to: analyze the target vehicle status information to determine at least one target information recipient; and transmit a notification signal to the target information recipient.

20 Claims, 6 Drawing Sheets

PROXIMITY-BASED VEHICLE TAGGING

TECHNICAL FIELD

The present disclosure relates generally to vehicle-to-server communication and, more particularly, to vehicle-to-server communication for identifying and locating other vehicles.

BACKGROUND

The ability of vehicle drivers to communicate ad hoc messages in real time to an appropriate authority to tag/identify another vehicle is limited. A faster, safer, and more reliable communication method is needed to tag vehicles that may need to be monitored for any reason. The ability to alert authorities to the presence of a disabled vehicle, a dangerous driver, or a courteous driver, for example, will allow for quicker response time by the proper authority when a response is needed. Many existing systems require the communicating driver to divert attention from driving when communicating a message, which can lead to unsafe road conditions and an increase in vehicle accidents. Additionally, many existing systems lack the ability to easily locate the tagged vehicle based on the location of the communicating vehicle. This can lead to delayed response times, which, in emergency situations, can result in increased injury to vehicle occupants. It would therefore be desirable to enable a driver of a vehicle to communicate in real time with authorities and with drivers of other vehicles on the road to tag/identify a vehicle that may need to be monitored and/or assisted for any reason. Therefore, what is needed is an apparatus, system, and/or method that addresses one or more of the foregoing issues, and/or one or more other issues.

SUMMARY

The present disclosure provides systems and methods for exchanging information between vehicles and the cloud in order to identify reckless, dangerous, or disabled vehicles and to alert appropriate authorities of such vehicles. A generalized system for tagging a vehicle includes a vehicle including a vehicle identification module. The vehicle identification module includes a user input processing module adapted to receive an initiation communication including a data set. The data set includes both target vehicle identifying data and target vehicle status information. The vehicle identification module further includes a transmitter adapted to transmit the data set. The system further includes a vehicle location database including identification information of a plurality of potential target vehicles. The system further includes a server including a server validation module. The server validation module is adapted to receive the data set from the transmitter of the vehicle identification module. The server validation module is further adapted to interrogate the vehicle location database for the identification information of the plurality of potential target vehicles. The server validation module is further adapted to identify a target vehicle of the plurality of potential target vehicles in the vehicle location database based on the target vehicle identifying data. The server further includes a recipient determination module. The recipient determination module is adapted to analyze the target vehicle status information to determine at least one target information recipient. The recipient determination module is further adapted to transmit a notification signal to the at least one target information recipient.

An additional generalized system for tagging a vehicle includes a vehicle including a user input processing module adapted to receive an initiation communication including a first data set. The first data set includes target vehicle identifying data. The system further includes a vehicle location database including identification information of a plurality of potential target vehicles. The system further includes a server including a server validation module. The server validation module is adapted to receive the identification information of the plurality of potential target vehicles in the vehicle location database. The server validation module is further adapted to identify a target vehicle of the plurality of potential target vehicles. The target vehicle is associated with the first data set. The server validation module is further adapted to validate the first data set by comparing the target vehicle identifying data received in the first data set with identification information of the target vehicle received from the vehicle location database. The server further includes a recipient determination module. The recipient determination module is adapted to analyze the first data set to determine at least one target information recipient. The recipient determination module is further adapted to transmit a notification signal to the at least one target information recipient.

A generalized method for tagging a vehicle includes receiving, at a user interface of a vehicle, an initiation communication including a first data set. The first data set includes both target vehicle identifying data and target vehicle status information. The method further includes transmitting the first data set to a server validation module of a server. The method further includes interrogating, by the server validation module, a vehicle location database including identification information of a plurality of potential target vehicles. The method further includes identifying, by the server validation module, a target vehicle of a plurality of potential target vehicles. The target vehicle is associated with the first data set. The method further includes, based on the first data set, determining at least one target information recipient of a plurality of target information recipients for sending a communication based on the target vehicle status information. The method further includes transmitting, by a recipient determination module, a notification signal to the at least one target information recipient.

DETAILED DESCRIPTION

For the purposes of promoting an understanding of the principles of the invention, reference will now be made to certain implementations, or examples, illustrated in the drawings, and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

This disclosure describes a communications system for tagging other vehicles. In the system, a driver of a vehicle on the road tags another vehicle on the road within a proximity of the driver. When tagging the other vehicle, the driver identifies the other vehicle and shares information about the other vehicle (e.g., identifying data and status information) with an intended recipient of the information. For example, the driver can: (1) inform a fire truck that a vehicle is broken down on the side of the road; (2) inform a fleet vehicle operations center that a fleet vehicle driver is driving well and in a courteous manner; or (3) inform a police car that a driver is driving erratically and dangerously. When the driver shares the information about the tagged vehicle with the intended recipient, the shared information also includes a location of the tagged vehicle.

Figure 1:
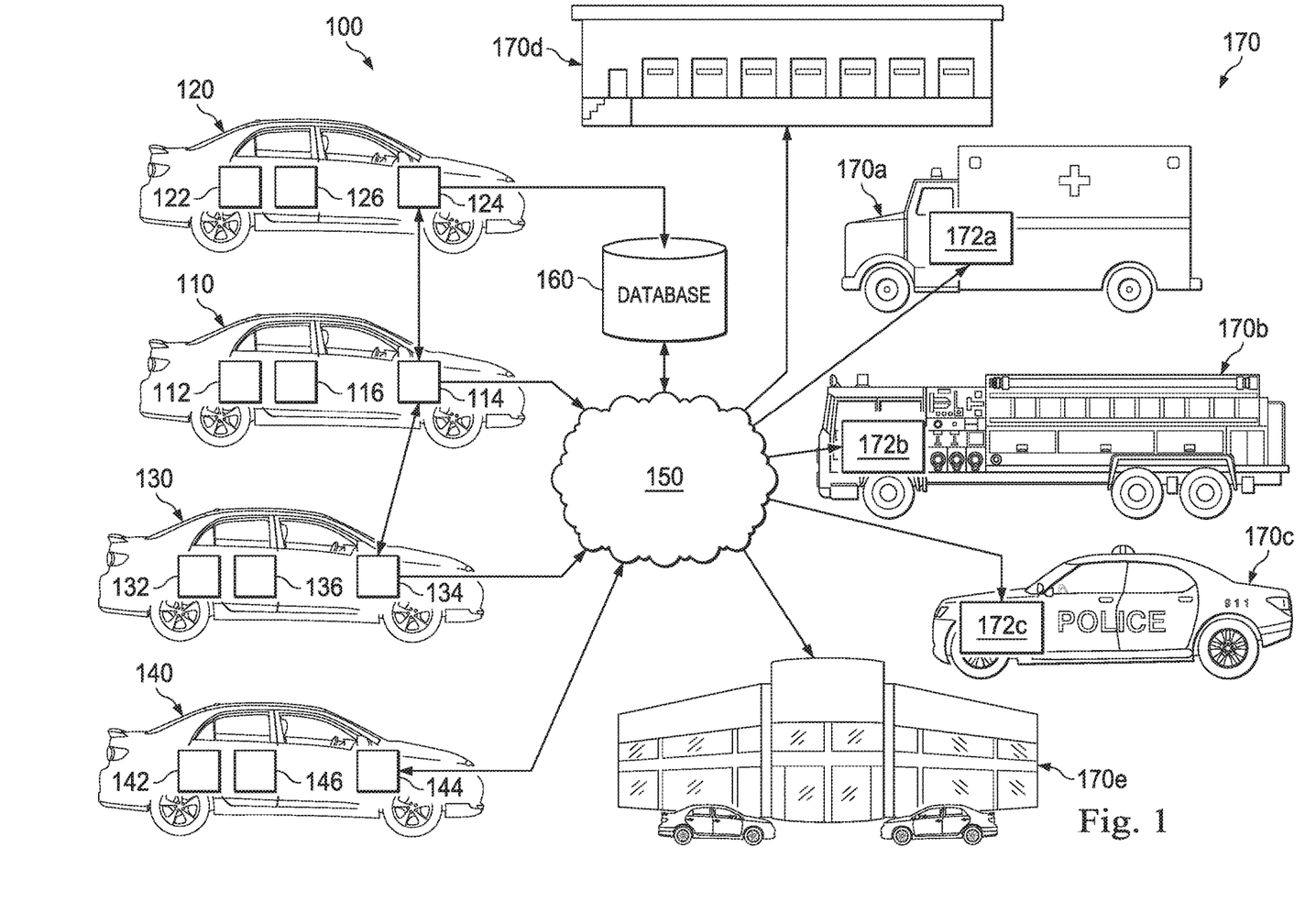
FIG. 1 is a diagrammatic illustration of a tagging system according to one or more embodiments of the present disclosure.

FIG. 1 is a diagrammatic illustration of a tagging system according to one or more embodiments of the present disclosure. In at least one such embodiment, as illustrated in FIG. 1, the system is generally referred to by the reference numeral 100 and includes a vehicle 110, a vehicle 120, a cloud server 150, a vehicle location database 160, and external recipients 170 (which may be information recipients). In several examples, the vehicle location database 160 includes one or more potential target vehicles, which will be discussed in further detail below. The tagging system 100 optionally includes additional vehicles, such as vehicle 130 and vehicle 140, as shown in FIG. 1. Additionally, the tagging system 100 optionally includes additional vehicle location databases. In the embodiment of FIG. 1, each of the vehicles 110, 120, 130, 140 are automobiles. While in FIG. 1 the vehicles 110, 120, 130, 140 are depicted as cars, it is to be understood that the vehicles 110, 120, 130, 140 may be any other type of suitable automobile (e.g., a pickup truck, a semi truck, a fleet vehicle, etc.). The vehicle 110 includes a human-machine interface (HMI) 112 (which may be a user interface), a vehicle identification module 114, and a vehicle sensor 116. The HMI 112 is operably coupled to, and adapted to be in communication with, the vehicle identification module 114. The vehicle sensor 116 is also operably coupled to, and adapted to be in communication with, the vehicle identification module 114. The vehicle identification module 114 is operably coupled to, and adapted to be in communication with, the cloud server 150. Additionally, the vehicle 120 is operably coupled to, and adapted to be in communication with the vehicle location database 160, which is itself operably coupled to, and adapted to be in communication with, the cloud server 150. The cloud server 150 is operably coupled to, and adapted to be in communication with, at least one target information recipient 170. The target information recipient 170 may be, include, or be part of a variety of information recipients, as will be described in further detail below; thus, as used herein, the reference numeral 170 (without the suffixes a, b, c, d, or e) may refer to one, or a combination, of information recipients 170a-e. For example, the target information recipient 170 may include an ambulance 170a, a fire truck 170b, a police car 170c, a fleet vehicle operations facility 170d, and a car dealership 170e. The cloud server 150 is adapted to transmit a signal to one or more of the information recipients 170, as will be described in further detail below. Some implementations employ wireless signal transmission, while in other implementations, wired signal transmissions are utilized. The ambulance 170a includes a receiver 172a that is operably coupled to, and adapted to receive a signal from, the cloud server 150 and/or another vehicle (e.g., any of the vehicles 110, 120, 130, 140). The fire truck 170b includes a receiver 172b that is operably coupled to, and adapted to receive a signal from, the cloud server 150 and/or another vehicle (e.g., any of the vehicles 110, 120, 130, 140). The police car 170c includes a receiver 172c that is operably coupled to, and adapted to receive a signal from, the cloud server 150 and/or another vehicle (e.g., any of the vehicles 110, 120, 130, 140).

Like the vehicle 110, the vehicle 120 includes a human-machine interface (HMI) 122, a vehicle identification module 124, and a vehicle sensor 126. The HMI 122 is operably coupled to, and adapted to be in communication with, the vehicle identification module 124. The vehicle sensor 126 is also operably coupled to, and adapted to be in communication with, the vehicle identification module 124. The vehicle identification module 124 is operably coupled to, and adapted to be in communication with, the cloud server 150. The vehicle 130 includes a human-machine interface (HMI) 132, a vehicle identification module 134, and a vehicle sensor 136. The HMI 132 is operably coupled to, and adapted to be in communication with, the vehicle identification module 134. The vehicle sensor 136 is also operably coupled to, and adapted to be in communication with, the vehicle identification module 134. The vehicle identification module 134 is operably coupled to, and adapted to be in communication with, the cloud server 150. The vehicle 140 includes a human-machine interface (HMI) 142, a vehicle identification module 144, and a vehicle sensor 146. The HMI 142 is operably coupled to, and adapted to be in communication with, the vehicle identification module 144. The vehicle sensor 146 is also operably coupled to, and adapted to be in communication with, the vehicle identification module 144. The vehicle identification module 144 is operably coupled to, and adapted to be in communication with, the cloud server 150.

Each vehicle identification module 114, 124, 134, 144 is adapted to be in communication with one or more of each of the other vehicle identification modules via vehicle-to-vehicle (V2V) communication. For example, the vehicle identification module 124 can transmit signals to and receive signals from the vehicle identification module 114, as will be described in further detail below. Additionally, while FIG. 1 only illustrates the vehicle identification module 124 in communication with the vehicle location database 160, it is to be understood that one or more of the other vehicle identification modules 114, 134, 144 may also communicate with the vehicle location database 160.

Figure 2:
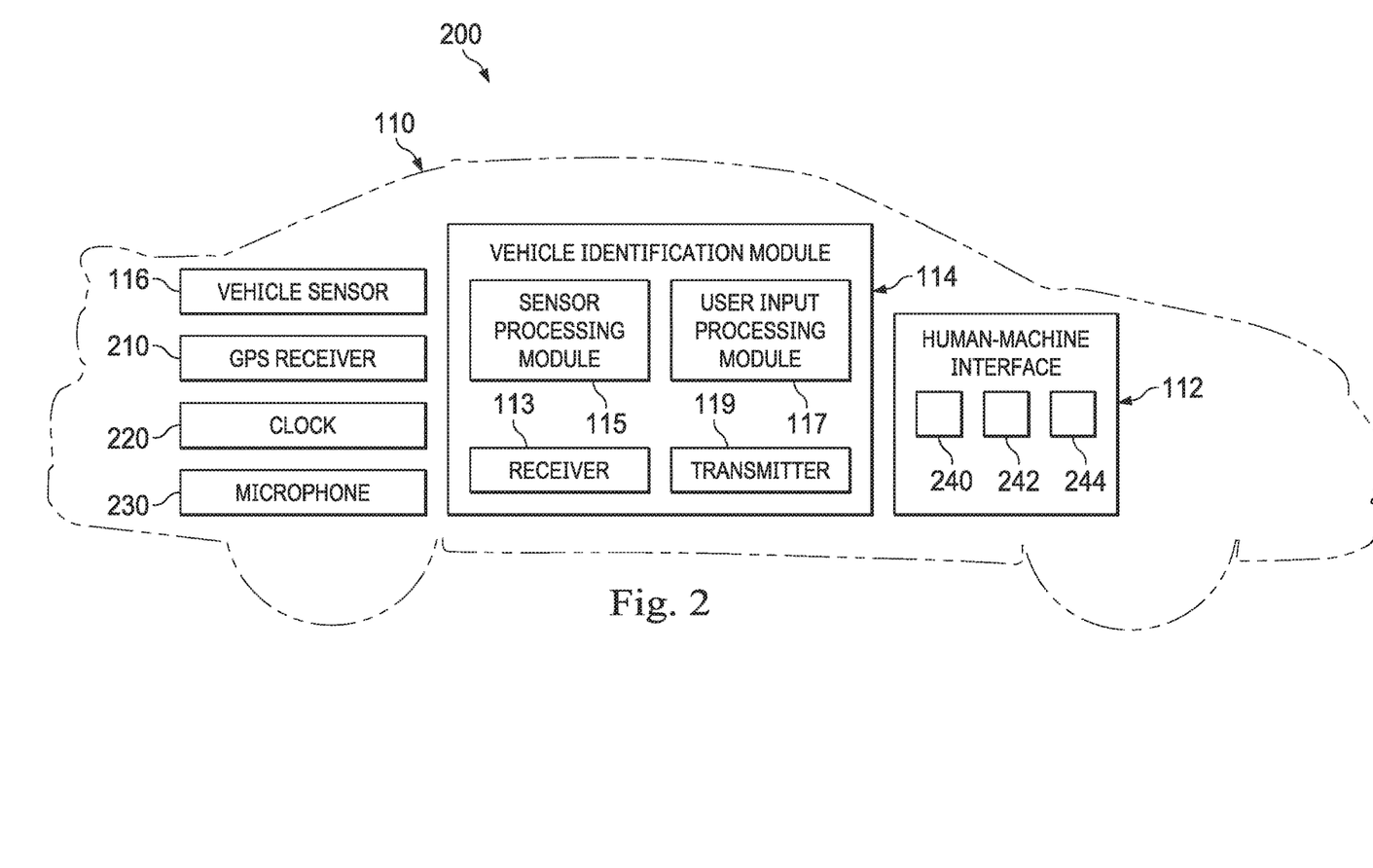
FIG. 2 is a diagrammatic illustration of an apparatus according to one or more embodiments of the present disclosure.

FIG. 2 is a diagrammatic illustration of an apparatus according to one or more embodiments of the present disclosure. In at least one such embodiment, as illustrated in FIG. 2, the apparatus is generally referred to by the reference numeral 200 and includes the components of the vehicle 110, which components are given the same reference numerals. In the embodiment shown in FIG. 2, the vehicle 110 includes a GPS receiver 210, a clock 220, and a microphone 230. In other embodiments, the microphone 230 may be included as a component of the HMI 112. In additional embodiments, the vehicle 110 and/or the HMI 112 may include multiple microphones 230. Similarly, in other embodiments, the GPS receiver 210 may be included as a component of the HMI 112. In the embodiment shown in FIG. 2, the vehicle identification module 114 includes a receiver 113, a sensor processing module 115, a user input processing module 117, and a transmitter 119. In several embodiments, the transmitter 119 and the receiver 113 are combined into a transceiver capable of both sending and receiving wireless signals. The receiver 113 is operably coupled to, and adapted to be in communication with, one or more of the vehicle sensor 116, the sensor processing module 115, the user input processing module 117, the transmitter 119, the GPS receiver 210, the clock 220, the microphone 230, and the HMI 112.

The HMI 112, which is operably coupled to, and adapted to be in communication with, the vehicle identification module 114, includes a display unit 240, an input/output (I/O) device 242, and a Bluetooth communication device 244. The I/O device 242 may be in the form of a communication port (e.g., a USB port), a touch-screen display unit, soft keys associated with a dashboard, a steering wheel, and/or other similar components of the vehicle 110. The display unit 240 may be, include, or be part of a plurality of display units arranged to show a visual output to a user. For example, in several embodiments, the display unit 240 may include one, or any combination, of a central display unit associated with the dashboard of the vehicle 110, an instrument cluster display unit associated with an instrument cluster of the vehicle 110, and a heads-up display unit associated with the dashboard and a windshield of the vehicle 110. Thus, as used herein the reference numeral 240 may refer to one, or a combination, of said display units.

The vehicle sensor 116, which is coupled to, and adapted to be in communication with, the vehicle identification module 114, may be, include, or be part of a plurality of vehicle cameras, for example. In several embodiments, the vehicle sensor 116 may include one, or any combination, of a front camera associated with a front portion of the vehicle 110 (e.g. the front bumper 110a), a rear camera associated with a rear portion of the vehicle 110 (e.g., the rear bumper 110b), a side camera associated with the right side portion 110c of the vehicle 110, a side camera associated with a left side portion 110d of the vehicle 110, and any other camera located on the vehicle 110. Thus, as used herein the reference numeral 116 may refer to one, or a combination, of the vehicle cameras. In several embodiments, the vehicle sensor 116 includes any other sensor capable of identifying and/or communicating with another vehicle (e.g., an RFID sensor, a Bluetooth sensor, etc.).

In several embodiments, the vehicle sensor 116 is adapted to transmit data to the receiver 113 of the vehicle identification module 114. In several embodiments, the vehicle sensor 116 transmits data to the receiver 113 in set, recurring time intervals. For example, the vehicle sensor 116 may transmit data to the receiver 113 at a transmission frequency rate that may range from about ten times per second to one time every ten seconds. In some examples, the transmission frequency may be about ten times per second, five times per second, one time per second, one time every five seconds, or any other suitable interval of time. The transmission frequency provided herein is for example only, and other embodiments may include more frequent transmissions or less frequent transmissions. For example, in some implementations, the transmission frequency may be faster than ten times per second or slower than one time every five seconds. In some embodiments, for example, when the vehicle sensor 116 includes one or more vehicle cameras, the data transmitted from the vehicle sensor 116 to the receiver 113 includes images captured by each of the one or more vehicle cameras of the vehicle sensor 116. In such examples, the vehicle sensor 116 can capture images of the exterior environment surrounding the vehicle 110 as the vehicle 110 drives along a road.

In some embodiments, the data (e.g., image data) transmitted by the vehicle sensor 116 is received by the sensor processing module 115. The data may be received by the sensor processing module 115 directly from the vehicle sensor 116, or the data may be received by the sensor processing module 115 indirectly from the vehicle sensor 116 via the receiver 113. In some examples, the sensor processing module 115 includes an image processor and/or an image processing module. In several embodiments, the sensor processing module 115 is adapted to read the data received from the vehicle sensor 116, analyze the data, process the data, and output the processed data to the transmitter 119. In several embodiments, the transmitter 119 then transmits the data to the cloud server 150, which will be described in further detail below.

In several embodiments, the GPS receiver 210 is operably coupled to, and adapted to be in communication with, the receiver 113 of the vehicle identification module 114. The GPS receiver 210 is adapted to record vehicle location data and transmit the vehicle location data to the receiver 113. The receiver 113 is adapted to be in communication with the transmitter 119. For example, the receiver 113 outputs the vehicle location data to the transmitter 119. In several embodiments, the transmitter 119 then transmits the vehicle location data to the cloud server 150, which will be described in further detail below. In some embodiments, each of the vehicles 110, 120, 130, 140 is adapted to communicate with one or more of the vehicles 110, 120, 130, 140 via vehicle-to-vehicle (V2V) communication, as discussed above. In such embodiments, the vehicle 120 is adapted to communicate a GPS location of the vehicle 120 to the vehicle 110, for example. The transmitter 119 of the vehicle identification module 114 may then transmit the GPS location of vehicle 120 to the server 150.

In several embodiments, the clock 220 is operably coupled to, and adapted to be in communication with, the receiver 113 of the vehicle identification module 114. In several embodiments, the clock 220 records a time at which each image is captured by the vehicle sensor 116. In other embodiments, the clock 220 records a time at which each image is sent from the vehicle sensor 116 to the receiver 113 or to the sensor processing module 115. The recorded times may be attached as a timestamp to each data transmission. In several embodiments, the clock 220 is adapted to transmit the timestamp information to the receiver 113. The receiver 113 is adapted to output the timestamp information to the transmitter 119. In several embodiments, the transmitter 119 then transmits the timestamp information to the cloud server 150, which will be described in further detail below.

In some embodiments, the microphone 230 is operably coupled to, and adapted to be in communication with, the receiver 113 of the vehicle identification module 114. In several embodiments, the microphone 230 may be, include, or be part of a plurality of microphones located throughout an interior of the vehicle 110. The microphone 230 is adapted to receive an input from one or more occupants of the vehicle 110 (e.g., the driver and/or one or more passengers). In several embodiments, the input received by the microphone 230 from the vehicle occupant(s) is a voice input, which will be described in further detail below. The voice input may include an initiation communication. For example, the driver of the vehicle 110 may speak a command and/or information into the microphone 230. In some embodiments, the microphone 230 may be included as a component of the human-machine interface (HMI) 112. In several embodiments, the initiation communication includes a data set that includes target vehicle identifying data and target vehicle status information, which will be described in further detail below. In some embodiments, the target vehicle identifying data may include one or more of a color, a make, a model, a type (e.g., truck, sedan, SUV, etc.), a license plate number, bumper stickers, decals, advertisements, or any other similar identifying features, which will be discussed in further detail below. In some examples, the target vehicle status information includes information regarding a state of the vehicle (e.g., broken down, on fire, stalled, etc.), information regarding the driving ability of a driver of the target vehicle (e.g., erratic driving, dangerous, driving, courteous driving, safe driving, etc.), or any other similar information about the target vehicle, which will be discussed in further detail below.

Figure 3:
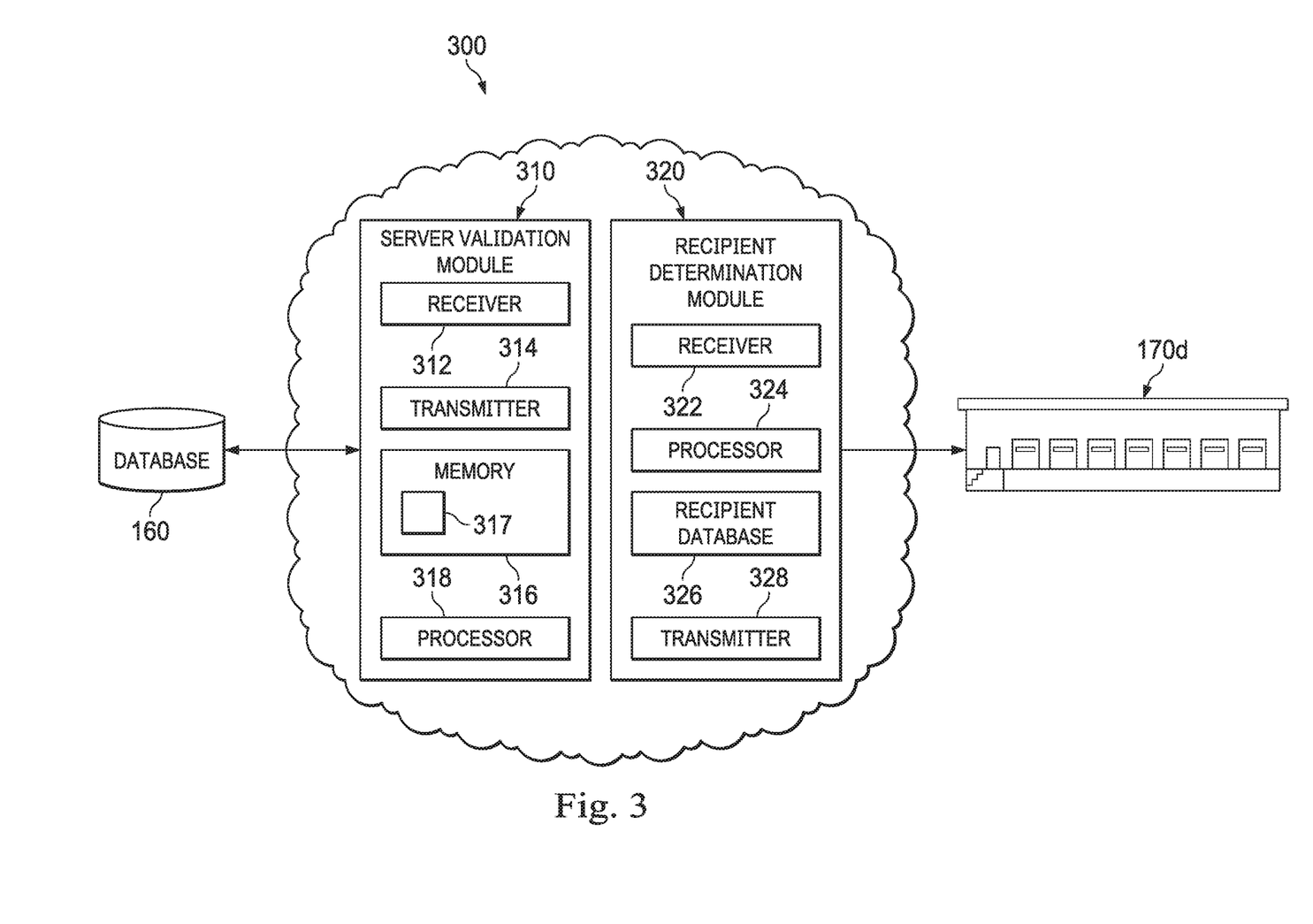
FIG. 3 is a diagrammatic illustration of a system in operation according to one or more embodiments of the present disclosure.

FIG. 3 is a diagrammatic illustration of a system in operation according to one or more embodiments of the present disclosure. In at least one such embodiment, as illustrated in FIG. 3, the system is generally referred to by the reference numeral 300 and includes the components of the tagging system 100, which components are given the same reference numerals. In the embodiment shown in FIG. 3, in addition to the system having certain components of the tagging system 100, the cloud server 150 of the system 300 includes a server validation module 310 and a recipient determination module 320. In the embodiment shown in FIG. 3, the server validation module 310 includes a receiver 312, a transmitter 314, a memory 316, and a processor 318. In several embodiments, the transmitter 314 and the receiver 312 are combined into a transceiver capable of both sending and receiving wireless or wired signals. The receiver 312 is operably coupled to, and adapted to be in communication with, one or more of the HMI 112 (see FIG. 2), the sensor processing module 115 (see FIG. 2), the user input processing module 117 (see FIG. 2), the transmitter 314, and the vehicle location database 160. In the embodiment shown in FIG. 3, the recipient determination module 320 includes a receiver 322, a processor 324, a recipient database 326, and a transmitter 328. In several embodiments, the transmitter 328 and the receiver 322 are combined into a transceiver capable of both sending and receiving wireless or wired signals. The receiver 322 is operably coupled to, and adapted to be in communication with, one or more of the HMI 112, the transmitter 119, and the transmitter 314 of the server validation module 310.

In several embodiments, the memory 316 is operably coupled to, and adapted to be in communication with, the receiver 312. In several embodiments, the receiver 312 is adapted to receive one or more data transmissions from the transmitter 119 of the vehicle identification module 114 carried on the vehicle 110. In several other embodiments, the receiver 312 is adapted to receive, in addition to or in lieu of the data transmissions received from the transmitter 119, data transmissions from the vehicle location database 160, which will be discussed in further detail below. The receiver 312 is adapted to output each of the one or more data transmissions to the memory 316, and the memory 316 stores each of the one or more data transmissions for a set period of time before discarding the data transmissions. In several embodiments, the data transmissions are stored in a historical record 317. In some examples, the set period of time for which the memory 316 stores the data transmission(s) includes one minute, two minutes, five minutes, ten minutes, or any other suitable period of time, which may be less than one minute or more than ten minutes. Therefore, the memory 316, in some embodiments, maintains the historical record 317 of all the data transmissions received by the receiver 312 from the transmitter 119. The historical record may be brief, and in some embodiments, may be about 30 minutes or less. In several embodiments, the historical data stored in the historical record 317 of the memory 316 is used by the processor 318 to validate the data processed by the sensor processing module 115 and/or the user input processing module 117, which will be discussed in further detail below.

In several embodiments, the processor 324 is operably coupled to, and adapted to be in communication with, the receiver 322, the recipient database 326, and the transmitter 328. In some embodiments, the processor 324 is adapted to read and analyze one or more data transmissions received from the receiver 322. The processor 324 is further adapted to analyze the recipient database 326 and determine, for each received data transmission, which one or more recipients in the recipient database 326 should receive the data transmission. This process will be described in further detail below. After the processor 324 determines the proper recipient(s) to receive the data transmission, the transmitter 328 transmits the data transmission to the proper recipient. In the embodiment shown in FIG. 3, which is illustrated for exemplary purposes only and is not intended to be limiting, the processor 324 determined that the proper recipient is the fleet vehicle operations facility 170*d* (see FIG. 1). In this example, after such a determination is made, the transmitter 328 of the recipient determination module 320 transmits a signal, which may be a notification signal, to the fleet vehicle operations facility 170*d*. In several embodiments, the notification signal includes location information of a tagged/identified vehicle (e.g., a target vehicle) and information regarding the status of the tagged/identified vehicle (e.g., the vehicle is broken down, a tail light is out on the vehicle, the driver of the vehicle is a good driver, etc.), which will be discussed in further detail below.

Figure 4:
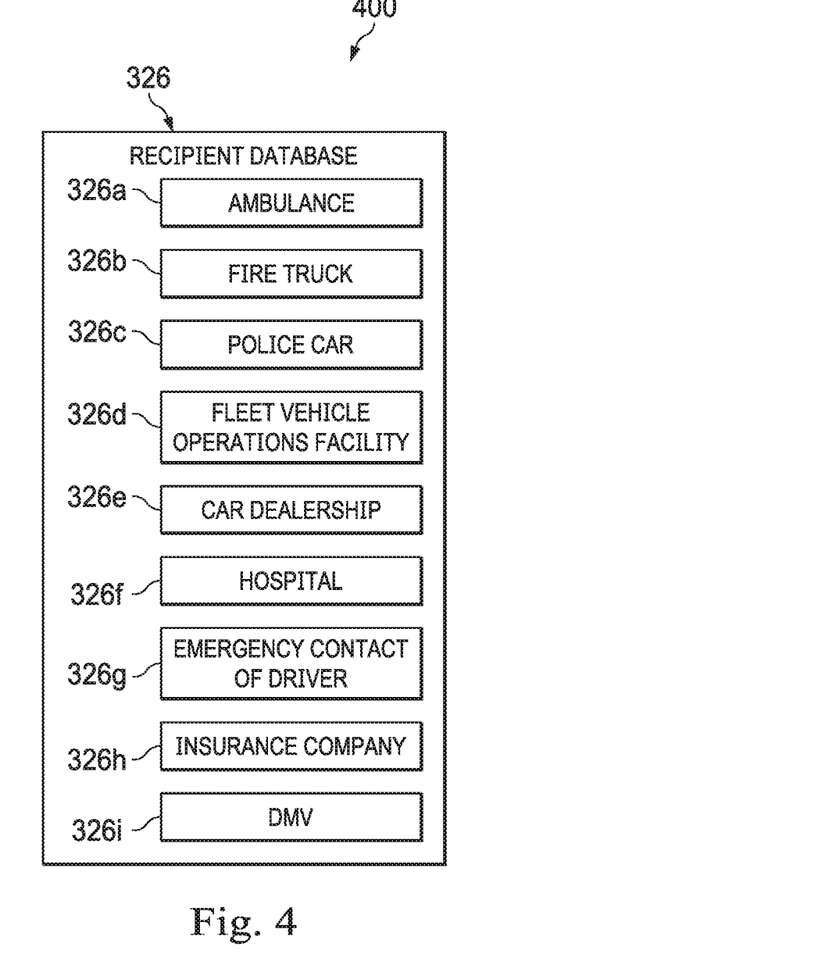
FIG. 4 is a diagrammatic illustration of an apparatus according to one or more embodiments of the present disclosure.

FIG. 4 is a diagrammatic illustration of an apparatus according to one or more embodiments of the present disclosure. In at least one such embodiment, as illustrated in FIG. 4, the apparatus is generally referred to by the reference numeral 400 and includes the components of the system 300, which components are given the same reference numerals. In the embodiment shown in FIG. 4, in addition to the apparatus 400 having certain components of the system 300, the recipient database 326 of the apparatus 400 includes several potential recipients. The recipients in the recipient database 326 are each adapted to receive a signal from the transmitter 328. In some examples, the potential recipients in the recipient database 326 include an ambulance 326*a* (which is similar to the ambulance 176*a*), a fire truck 326*b* (which is similar to the fire truck 176*b*), a police car 326*c* (which is similar to the police car 176*c*), a fleet vehicle operations facility 326*d* (which is similar to the fleet vehicle operations facility 176*d*), a car dealership 326*e* (which is similar to the car dealership 176*e*), a hospital 326*f*, an emergency contact 326*g* of the driver of the vehicle 110, an insurance company 326*h*, and a Department of Motor Vehicles (DMV) 326i. As discussed above and as will be discussed in further detail below, the processor 324 is adapted to analyze the recipient database 326 and determine, for each received data transmission, which one or more recipients in the recipient database 326 should receive a notification signal based on each received data transmission. In several embodiments, each received data transmission relates to a tagged/identified vehicle, which will be discussed in further detail below. After the processor 324 determines the proper recipient to receive the notification signal, the transmitter 328 transmits the notification signal to the proper recipient. In some examples, the transmitter 328 may transmit the notification signal to one or more recipients. For example, the transmitter 328 may transmit the notification signal to the ambulance 326a, the fire truck 326b, the police car 326c, and the hospital 326f. In other examples, the transmitter 328 may transmit the notification signal only to the police car 326c.

Figure 5:
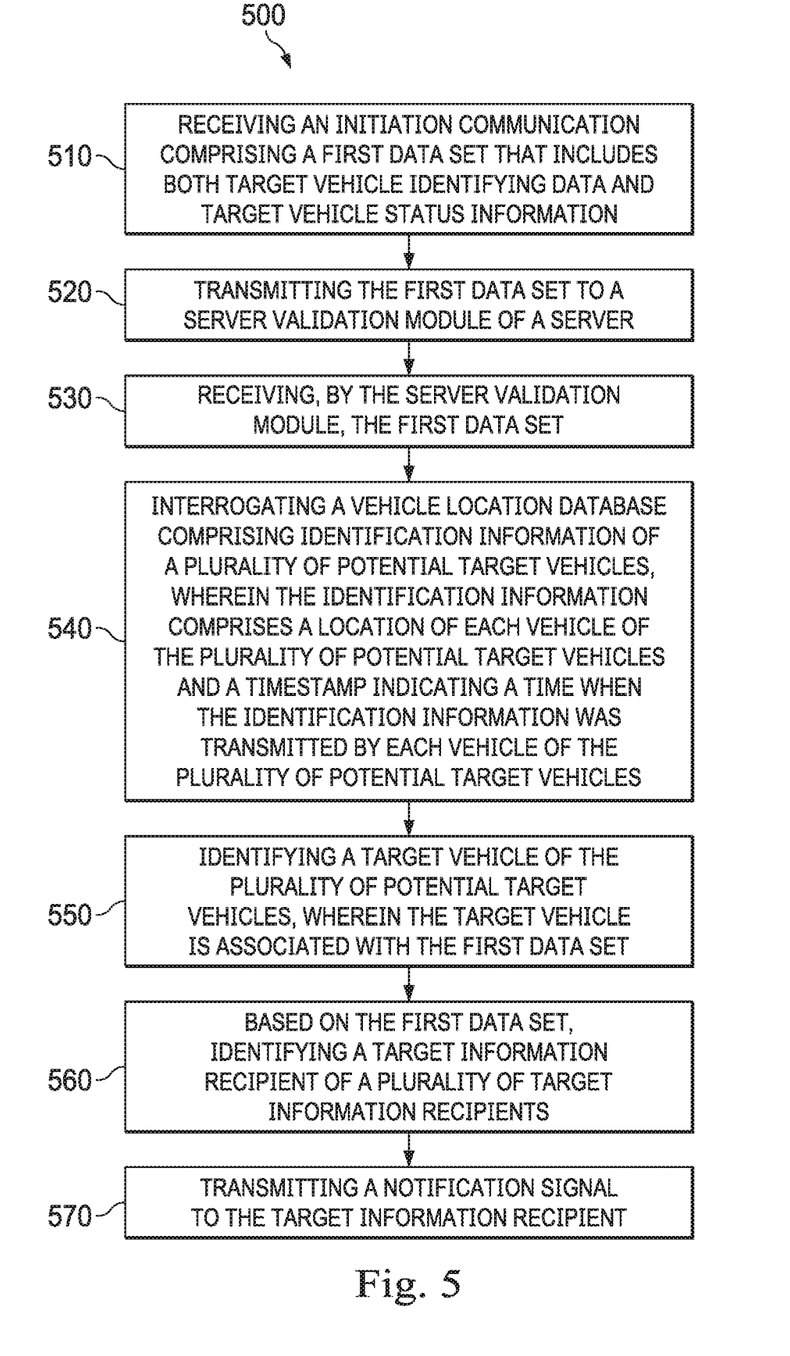
FIG. 5 is a flow chart illustration of a method of operating the system of FIGS. 1-4 according to one or more embodiments of the present disclosure.

FIG. 5 is a flow chart illustration of a method of operating the tagging system 100 of FIGS. 1-4 according to one or more embodiments of the present disclosure. The method is carried out in response to the vehicle identification module 114 receiving an input from at least one of: (1) one or more occupants of the vehicle 110 (e.g., the driver and/or one or more passengers); or (2) the vehicle sensor 116.

In several embodiments, as discussed above, a driver of a vehicle (e.g., the vehicle 110) tags another vehicle on the road (e.g., the vehicle 120) within a proximity of the vehicle 110. When tagging the other vehicle, the vehicle 110 receives information from the driver of the vehicle 110, and the information includes identifying data and status information for the other vehicle. The vehicle 110 transmits this identifying data and status information to a server. The server receives the information, analyzes the information, and then determines a target recipient (which may be a target information recipient) to which the status information should be sent. It is an object of the server to validate the received information before sending the status information to the target recipient. This helps reduce the number of false reports transmitted to potential target recipients. To achieve this end, the server compares the information received from the vehicle 110 with a database of information for several other vehicles and determines if there is a match. If there is a match, the server then transmits the status information of the other vehicle (e.g., the vehicle 120) to the determined target recipient. The server also transmits the location of the other vehicle to the determined target recipient to allow the target recipient to take proper action, if needed.

In one such embodiment, as illustrated in FIG. 5, the method is generally referred to by the reference numeral 500 and includes at a step 510 receiving an initiation communication comprising a first data set that includes both target vehicle identifying data and target vehicle status information. In some embodiments, the initiation communication is received by the receiver 113 of the vehicle identification module 114. The receiver 113 may then output the initiation communication to the sensor processing module 115 and/or the user input processing module 117 for further analysis and processing.

In several embodiments, the initiation communication includes one or more of a voice input, a touch input (e.g., the driver may select an option on a touchscreen of the HMI 112, the driver may press a button on the dashboard of the vehicle 110, the driver may press a button on the steering wheel of the vehicle 110, etc.), a visual input (e.g., the HMI 112 may detect where the driver focuses his or her vision on a screen of the HMI 112), or any other similar input. In some embodiments, the initiation communication includes a combination of one or more of the above inputs. For example, the driver of the vehicle 110 may press a button on the steering wheel to activate the microphone 230, and then the driver may speak identification information, such as identifying characteristics, of another vehicle (e.g., the vehicle 120 (see FIG. 1), which may be a target vehicle). In several embodiments, the first data set includes the identification information of the vehicle 120, for example. In such embodiments, as discussed above, the initiation communication and/or the identification information includes identifying data of the vehicle 120 (which may be target vehicle identifying data) and status information of the vehicle 120 (which may be target vehicle status information). In some embodiments, the identification information in the first data set is information that is identified by the driver of the vehicle 110 and/or by one or more passengers in the vehicle 110. The target vehicle identifying data may include one or more of a color, a make, a model, a type (e.g., truck, sedan, SUV, etc.), a license plate number, bumper stickers, decals, advertisements, or any other similar identifying features. In several embodiments, each vehicle is associated with a distinct set of identification information. For example, each of the vehicles 110, 120, 130, 140 is associated with its own set of identification information.

In embodiments where the driver of the vehicle 110 interacts with a touchscreen of the HMI 112, the touchscreen may display all of the vehicles that are currently within the proximity of the vehicle 110. The proximity of the vehicle 110 includes an exterior environment surrounding the vehicle 110. In several embodiments, the vehicles within the proximity of the vehicle 110 may include one or more vehicles immediately surrounding the vehicle 110, one or more vehicles within 500 feet of the vehicle 110, or one or more vehicles within any other suitable distance from the vehicle 110, which may be greater than 500 feet from the vehicle 110. The touchscreen may display the surrounding vehicles (e.g., the vehicles 120, 130, 140) with separate icons identifying each vehicle by type and color. In some embodiments, the icons may also include the make, model, and/or any other identifying characteristic of each vehicle. In other examples, the touchscreen may display the surrounding vehicles in a list without including pictorial icons. The list of the surrounding vehicles may identify each vehicle by one or more of color, type, make, model, or any other identifying characteristic. For example, one of the vehicles may be listed as "Blue Toyota RAV4."

In some embodiments, the driver of the vehicle 110 may press the pictorial icons or the phrases in the list to identify one or more of the surrounding vehicles as a target vehicle. In other embodiments, the driver of the vehicle 110 may focus his or her vision on one of the icons or phrases in the list to identify one or more of the surrounding vehicles as a target vehicle. In several embodiments, the vehicle 110 is capable of operating in an autonomous mode. In such embodiments, it may be easier for the driver of the vehicle 110 to identify the target vehicle using a touch input and/or a visual input, as discussed above. In further embodiments, as discussed above, the driver of the vehicle 110 may identify one or more of the vehicles surrounding the vehicle 110 by speaking identification information of a target vehicle. The microphone 230 (see FIG. 2) of the vehicle 110 identifies and records the driver's voice when the driver is speaking.

In several embodiments, as discussed above, the vehicle sensor 116 is adapted to capture images of objects, such as vehicles (e.g., the vehicle 120), within the proximity of the vehicle 110. In some embodiments, the vehicle sensor 116 transmits each captured image to the sensor processing module 115 of the vehicle identification module 114. In several examples, a GPS location of the vehicle 110 and a timestamp are transmitted with each captured image. In some embodiments, the GPS location information indicates the location of the vehicle 110 at the moment each image was captured. In some examples, the timestamp information indicates the time at which each image was captured. In several embodiments, the sensor processing module 115 is adapted to analyze each image and identify identification information (e.g., target vehicle identifying data) of each vehicle (e.g., the vehicle 120) included in each captured image. The target vehicle identifying data may include one or more of a color, a make, a model, a type (e.g., truck, sedan, SUV, etc.), a license plate number, bumper stickers, decals, advertisements, or any other similar identifying features. In some embodiments, after the sensor processing module 115 processes each received image, the vehicle identification module 114 transmits each processed image, and each processed image's corresponding GPS location information and timestamp, to the server validation module 310. The processed images and corresponding GPS location information and timestamps may be stored in the historical record 317 of the memory 316 of the server validation module 310. Therefore, in several embodiments, the memory 316 maintains the historical record 317 of all data transmissions received from the vehicle identification module 114. In several examples, the data transmissions include the processed images, each processed image's corresponding GPS location and timestamp, the target vehicle identifying data, and target vehicle status information, which will be described in further detail below.

At a step 520 during or after receiving the initiation communication, the first data set is transmitted to the server validation module 310 of the server 150. In several embodiments, the initiation communication is transmitted by the transmitter 119 of the vehicle identification module 114. At a step 530, the first data set is received by the server validation module 310. In several embodiments, the initiation communication is received by the receiver 312 of the server validation module 310.

At a step 540 before, during, or after receiving the initiation communication, the server validation module 310 interrogates the vehicle location database 160. In several embodiments, the vehicle location database 160 includes identification information for at least one vehicle, such as the vehicle 120 (which may be a target vehicle and/or a potential target vehicle), for example. In several embodiments, the vehicle location database 160 includes identification information for a plurality of potential target vehicles, which may include each vehicle connected to the server 150. Each potential target vehicle may also transmit a GPS location corresponding to each, respective potential target vehicle to the vehicle location database 160. In some embodiments, each potential target vehicle, such as the vehicle 120, for example, transmits a GPS location to the vehicle location database 160 every 30 seconds, every minute, every two minutes, every five minutes, or in any other suitable interval of time, which may be faster than every 30 seconds or longer than every five minutes. Therefore, in several embodiments, the vehicle location database 160 includes a current or nearly current location of each potential target vehicle in the tagging system 100 (see FIG. 1).

In some embodiments, as discussed above, the tagging system 100 may include more than one vehicle location database 160. For example, the tagging system 100 may include one vehicle location database 160 corresponding to one or more providers (e.g., an Internet service provider, a wireless communication systems provider, etc.). In such embodiments, the server validation module 310 may interrogate each vehicle location database 160.

In several embodiments, the identification information is received by the receiver 312 of the server validation module 310. In several examples, the processor 318 of the server validation module 310 receives the identification information for each vehicle in the vehicle location database 160. The processor 318 parses the identification information received from the vehicle location database 160. Further, the processor 318 compares the parsed identification information to the identification information received from the vehicle identification module 114 of the vehicle 110 (e.g., the identification information received in the first data set).

In several embodiments, the server validation module 310 reduces the amount of identification information to be parsed before parsing the identification information received from the vehicle location database 160. In such embodiments, the processor 318 of the server validation module 310 queries the vehicle location database 160 to determine which vehicle or vehicles were within the proximity of the vehicle 110 at the time indicated in the timestamp of the initiation communication received by the vehicle identification module 114. The processor 318 uses the GPS location of the vehicle 110 in the initiation communication to tailor a query for the vehicle location database 160. In some embodiments, the query returns a subset of identification information that is a subset of the entire amount of identification information present in the vehicle location database 160. The processor 318 may parse the subset of identification information and compare the parsed identification information to the identification information received from the vehicle identification module 114 of the vehicle 110 (e.g., the identification information received in the first data set).

At a step 550 during or after interrogating the vehicle location database 160, a target vehicle (e.g., the vehicle 120) of the plurality of potential target vehicles is identified by the server validation module 310, and the target vehicle is associated with the first data set. In several embodiments, the server validation module 310 determines which identification information of a vehicle in the vehicle location database 160 matches with the identification information received from the vehicle identification module 114 of the vehicle 110. In some embodiments, when there is a match, the server validation module 310 stops parsing the identification information in the vehicle location database 160. In various examples, the server validation module 310 determines the location of the vehicle 120, for example, based on the identification information associated with the vehicle 120, which includes GPS location data for the vehicle 120.

In several embodiments, after the server validation module 310 determines there is a match, the server validation module 310 augments the location information of the vehicle 120. This allows the server validation module 310 to confirm the location of the vehicle 120 and to help reduce the occurrence of incorrect reports by the driver and/or a passenger of the vehicle 110 (e.g., to help reduce the occurrence of an incorrect initiation communication, an incorrect first data set, an incorrect notification signal, etc.). In some embodiments, the server validation module 310 augments the location information for the vehicle 120 by comparing the identification information received from the vehicle identification module 114 with the historical identification information stored in the historical record 317 of the memory 316. Accordingly, the server validation module 310 augments the location information received from the vehicle location database 160 with the identification information captured by the vehicle sensor 116. In such examples, the server validation module 310 determines whether the identification information for one or more vehicles in the vehicle location database 160 matches with the identification information captured by the vehicle sensor 116. In some examples, if the server validation module 310 determines that there is a match, then the server validation module 310 determines if the GPS location and timestamp corresponding to the identification information captured by the vehicle sensor 116 matches with the GPS location and timestamp corresponding to the identification information received from the vehicle location database 160. In several examples, after the location information is validated by the server validation module 310, the identification information received from the vehicle identification module 114 is transmitted to the recipient determination module 320.

In some embodiments, the server validation module 310 augments the location information of the vehicle 120 by comparing the identification information received from the vehicle identification module 114 with identification information received from one or more vehicles (e.g., the vehicles 130, 140). Accordingly, the server validation module 310 augments the location information received from the vehicle 110 with the location information received from the vehicles 130 and 140. In such examples, the server validation module 310 determines whether the identification information received from the vehicle 110 matches with the identification information received from one or both of the vehicles 130, 140. In some examples, if the server validation module 310 determines that there is a match, then the server validation module 310 determines if the GPS location and timestamp corresponding to the identification information received from the vehicle 110 matches with the GPS location and timestamp corresponding to the identification information received from one or both of the vehicles 130, 140. In several examples, after the location information is validated by the server validation module 310, the identification information received from the vehicle identification module 114 is transmitted to the recipient determination module 320.

At a step 560 during or after identifying the target vehicle associated with the first data set, a target information recipient of a plurality of target information recipients is identified. In several embodiments, the target information recipient is identified by the recipient determination module 320. In some embodiments, the identification information includes target vehicle status information, which may be a message including a notification about the target vehicle (e.g., the vehicle 120), for example. As discussed above, in some examples, the target vehicle status information includes information regarding a state of the vehicle (e.g., broken down, on fire, stalled, etc.), information regarding the driving ability of a driver of the target vehicle (e.g., erratic driving, dangerous, driving, courteous driving, safe driving, etc.), or any other similar information about the target vehicle. In several embodiments, the processor 324 of the recipient determination module 320 analyzes the target vehicle status information received by the vehicle identification module 114 of the vehicle 110 to determine what message the driver and/or a passenger of the vehicle 110 included about the vehicle 120. In several non-limiting examples, as discussed above, the message may include a notification that the vehicle 120 is broken down on the side of the road, a notification that a tail light of the vehicle 120 is out, a notification that the driver of the vehicle 120 is driving well, a notification that the driver of the vehicle 120 is driving recklessly, or any other similar notification. In several examples, the processor 324 of the recipient determination module 320 analyzes the target vehicle status information and uses a rule-based algorithm to determine which one or more target information recipients 170 (see FIG. 1) should receive the target vehicle status information. Therefore, in several examples, the processor 324 determines/identifies a target information recipient 170.

In several embodiments, the processor 324 uses a language-based interpretation algorithm to determine the content of the message. In alternative embodiments, the language-based interpretation algorithm may be included in the user input processing module 117 of the vehicle identification module 114. In such embodiments, the vehicle identification module 114 may transmit the processed message to the server 150. In other embodiments, both the processor 324 and the user input processing module 117 may each use a language-based interpretation algorithm to determine the content of the message. In further embodiments, the processor 324 may use a combination of the rule-based algorithm and the language-based interpretation algorithm to determine the content of the message.

At a step 570 during or after analyzing the first data set, a notification signal is transmitted to the target information recipient. In several embodiments, the notification signal is transmitted by the transmitter 328 of the recipient determination module 320. In several embodiments, based on the content of the target vehicle status information, the processor 324 sends a notification signal to at least one recipient in the recipient database 326. In various examples, the notification signal may include the content of the target vehicle status information received from the vehicle identification module 114. In other examples, the notification signal may simply include the location of the vehicle 120, for example, and a notification instructing the recipient(s) to go to the location of the vehicle 120.

In one example that is not intended to be limiting, the target vehicle status information received from the vehicle identification module 114 includes a statement from the driver of the vehicle 110 that the vehicle 120 is on fire on the side of the road. In this example, the processor 324 of the recipient determination module 320 may determine that a notification signal should be sent to an ambulance (e.g., the ambulance 326*a*), a fire truck (e.g., the fire truck 326*b*), a police car (e.g., the police car 326*c*), a hospital (e.g., the hospital 326*0*), and an emergency contact of the driver of the vehicle 120 (e.g., the emergency contact 326*g*).

In another example that is not intended to be limiting, the target vehicle status information received from the vehicle identification module 114 includes a statement from the driver of the vehicle 110 that the driver of the vehicle 120 is driving well and in a safe manner. In examples where the vehicle 120 is a fleet vehicle, the processor 324 of the recipient determination module 320 may determine that a notification signal should be sent to a fleet vehicle operations facility (e.g., the fleet vehicle operations facility 326*d*).

Figure 6:
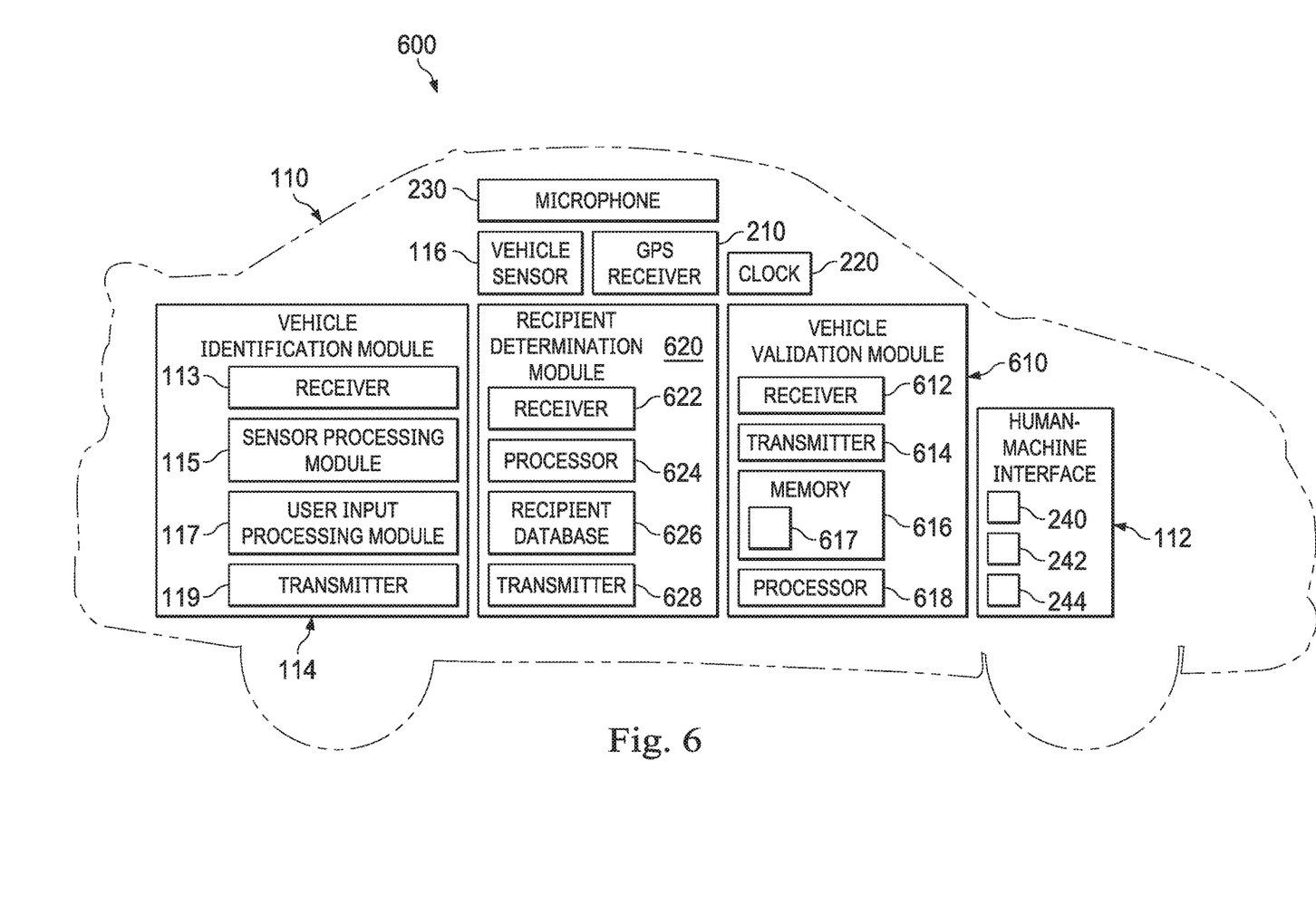
FIG. 6 is a diagrammatic illustration of an apparatus according to one or more embodiments of the present disclosure.

FIG. 6 is a diagrammatic illustration of an apparatus according to one or more embodiments of the present disclosure. In FIG. 6, the apparatus is generally referred to by the reference numeral 600 and includes the components of the vehicle 110 and the components of the apparatus 200, which components are given the same reference numerals. That is, the apparatus 600 includes everything shown in FIG. 2, plus some additional components. In the embodiment shown in FIG. 6, in addition to the apparatus 600 having certain components of the apparatus 200, the vehicle 110 of the apparatus 600 includes a vehicle validation module 610 and a recipient determination module 620. In the embodiment shown in FIG. 6, the vehicle validation module 610 includes a receiver 612, a transmitter 614, a memory 616, and a processor 618. In several embodiments, the transmitter 614 and the receiver 612 are combined into a transceiver capable of both sending and receiving wireless signals. The receiver 612 is operably coupled to, and adapted to be in communication with, one or more of the HMI 112, the sensor processing module 115, the user input processing module 117, the transmitter 119, the transmitter 614, and the vehicle location database 160. In the embodiment shown in FIG. 6, the recipient determination module 620 includes a receiver 622, a processor 624, a recipient database 626, and a transmitter 628. In several embodiments, the transmitter 628 and the receiver 622 are combined into a transceiver capable of both sending and receiving wireless signals. The receiver 622 is operably coupled to, and adapted to be in communication with, one or more of the HMI 112, the transmitter 119, the transmitter 614, and the transmitter 628.

In several embodiments, the memory 616 is operably coupled to, and adapted to be in communication with, the receiver 612. In several embodiments, the receiver 612 is adapted to receive one or more data transmissions from the transmitter 119 of the vehicle identification module 114. In several other embodiments, the receiver 612 is adapted to receive, in addition to or in lieu of the data transmissions received from the transmitter 119, data transmissions from the vehicle location database 160, which will be discussed in further detail below. The receiver 612 is adapted to output each of the one or more data transmissions to the memory 616, and the memory 616 stores each of the one or more data transmissions for a set period of time before discarding the data transmissions. In several embodiments, the data transmissions are stored in a historical record 617. In some examples, the set period of time for which the memory 616 stores the data transmission(s) includes one minute, two minutes, five minutes, ten minutes, or any other suitable period of time, which may be less than one minute or more than ten minutes. The historical record may be brief, and in some embodiments, may be about 30 minutes or less. Therefore, the memory 616, in some embodiments, maintains the historical record 617 of all of the data transmissions received by the receiver 612 from the transmitter 119. In several embodiments, the historical data stored in the historical record 617 of the memory 616 is used by the processor 618 to validate the data processed by the sensor processing module 115 and/or the user input processing module 117, which will be discussed in further detail below.

In several embodiments, the processor 624 is operably coupled to, and adapted to be in communication with, the receiver 622, the recipient database 626, and the transmitter 628. In some embodiments, the processor 624 is adapted to read and analyze one or more data transmissions received from the receiver 622. The processor 624 is further adapted to analyze the recipient database 626 and determine, for each received data transmission, which one or more recipients in the recipient database 626 should receive the data transmission, which may be, for example, a notification signal. This process will be described in further detail below. After the processor 624 determines the proper recipient(s) to receive the data transmission, the transmitter 628 transmits the data transmission to the proper recipient(s).

As discussed above with respect to step 510 in FIG. 5, in several alternative embodiments, after the sensor processing module 115 processes each received image, the vehicle identification module 114 transmits each processed image, and each processed image's corresponding GPS location information and timestamp, to the vehicle validation module 610. The processed images and corresponding GPS location information and timestamps may be stored in the historical record 617 of the memory 616 of the vehicle validation module 610. Therefore, in several embodiments, the memory 616 maintains the historical record 617 of all data transmissions received from the vehicle identification module 114. In several examples, the data transmissions include the processed images and each processed image's corresponding GPS location and timestamp.

As discussed above with respect to steps 520 and 530 in FIG. 5, in several alternative embodiments, the initiation communication is received by the vehicle validation module 610. In several embodiments, the initiation communication is received by the receiver 612 of the vehicle validation module 610.

As discussed above with respect to step 540 in FIG. 5, in several alternative embodiments, at the step 540 before, during, or after receiving the initiation communication, the vehicle validation module 610 interrogates the vehicle location database 160. In several embodiments, the vehicle location database 160 includes identification information for at least one vehicle, such as the vehicle 120 (which may be a target vehicle and/or a potential target vehicle), for example. In several embodiments, the vehicle location database 160 includes identification information for a plurality of potential target vehicles, which may include each vehicle connected to the server 150. Each potential target vehicle may also transmit a GPS location corresponding to each, respective potential target vehicle to the vehicle location database 160. In some embodiments, each potential target vehicle, such as the vehicle 120, for example, transmits a GPS location to the vehicle location database 160 every 30 seconds, every minute, every two minutes, every five minutes, or in any other suitable interval of time, which may be faster than every 30 seconds or longer than every five minutes. Therefore, in several embodiments, the vehicle location database 160 includes a current or nearly current location of each potential target vehicle in the tagging system 100 (see FIG. 1).

In some embodiments, as discussed above, the tagging system 100 may include more than one vehicle location database 160. For example, the tagging system 100 may include one vehicle location database 160 corresponding to one or more providers (e.g., an Internet service provider, a wireless communication systems provider, etc.). In such embodiments, the vehicle validation module 610 may interrogate each vehicle location database 160.

In several embodiments, the identification information is received by the receiver 612 of the vehicle validation module 610. In several examples, the processor 618 of the vehicle validation module 610 receives the identification information for each vehicle in the vehicle location database 160. The processor 618 parses the identification information received from the vehicle location database 160. Further, the processor 618 compares the parsed identification information to the identification information received from the vehicle identification module 114 of the vehicle 110 (e.g., the identification information received in the first data set).

In several embodiments, the vehicle validation module 610 reduces the amount of identification information to be parsed before parsing the identification information received from the vehicle location database 160. In such embodiments, the processor 618 of the vehicle validation module 610 queries the vehicle location database 160 to determine which vehicle or vehicles were within the proximity of the vehicle 110 at the time indicated in the timestamp of the initiation communication received by the vehicle identification module 114. The processor 618 uses the GPS location of the vehicle 110 in the initiation communication to tailor a query for the vehicle location database 160. In some embodiments, the query returns a subset of identification information that is a subset of the entire amount of identification information present in the vehicle location database 160. The processor 618 may parse the subset of identification information and compare the parsed identification information to the identification information received from the vehicle identification module 114 of the vehicle 110 (e.g., the identification information received in the first data set).

As discussed above with respect to step 550 in FIG. 5, in several alternative embodiments, at the step 550 during or after interrogating the vehicle location database 160, a target vehicle (e.g., the vehicle 120) of the plurality of potential target vehicles is identified by the vehicle validation module 610, and the target vehicle is associated with the first data set. In several embodiments, the vehicle validation module 610 determines which identification information of a vehicle in the vehicle location database 160 matches with the identification information received from the vehicle identification module 114 of the vehicle 110. In some embodiments, when there is a match, the vehicle validation module 610 stops parsing the identification information in the vehicle location database 160. In various examples, the vehicle validation module 610 determines the location of the vehicle 120, for example, based on the identification information associated with the vehicle 120, which includes GPS location data for the vehicle 120.

In several embodiments, after the vehicle validation module 610 determines there is a match, the vehicle validation module 610 augments the location information for the vehicle 120. This allows the vehicle validation module 610 to confirm the location of the vehicle 120 and to help reduce the occurrence of incorrect reports by the driver and/or a passenger of the vehicle 110 (e.g., to help reduce the occurrence of an incorrect initiation communication, an incorrect first data set, an incorrect notification signal, etc.). In some embodiments, the vehicle validation module 610 augments the location information for the vehicle 120 by comparing the identification information received from the vehicle identification module 114 with the historical identification information stored in the historical record 617 of the memory 616. Accordingly, the vehicle validation module 610 augments the location information received from the vehicle location database 160 with the identification information captured by the vehicle sensor 116. In such examples, the vehicle validation module 610 determines whether the identification information for one or more vehicles in the vehicle location database 160 matches with the identification information captured by the vehicle sensor 116. In some examples, if the vehicle validation module 610 determines that there is a match, then the vehicle validation module 610 determines if the GPS location and timestamp corresponding to the identification information captured by the vehicle sensor 116 matches with the GPS location and timestamp corresponding to the identification information received from the vehicle location database 160. In several examples, after the location information is validated by the vehicle validation module 610, the identification information received from the vehicle identification module 114 is transmitted to the recipient determination module 620.

In some embodiments, the vehicle validation module 610 augments the location information of the vehicle 120 by comparing the identification information received from the vehicle identification module 114 with identification information received from one or more vehicles (e.g., the vehicles 130, 140). Accordingly, the vehicle validation module 610 augments the location information received from the vehicle 110 with the location information received from the vehicles 130 and 140. In such examples, the vehicle validation module 610 determines whether the identification information received from the vehicle 110 matches with the identification information received from one or both of the vehicles 130, 140. In some examples, if the vehicle validation module 610 determines that there is a match, then the vehicle validation module 610 determines if the GPS location and timestamp corresponding to the identification information received from the vehicle 110 matches with the GPS location and timestamp corresponding to the identification information received from one or both of the vehicles 130, 140. In several examples, after the location information is validated by the vehicle validation module 610, the identification information received from the vehicle identification module 114 is transmitted to the recipient determination module 620.

As discussed above with respect to step 560 in FIG. 5, in several alternative embodiments, at the step 560 during or after identifying the target vehicle associated with the first data set, a target information recipient of a plurality of target information recipients is identified. In several embodiments, the target information recipient is identified by the recipient determination module 620. In some embodiments, the identification information includes target vehicle status information, which may be a message including a notification about the target vehicle (e.g., the vehicle 120), for example. As discussed above, in some examples, the target vehicle status information includes information regarding a state of the vehicle (e.g., broken down, on fire, stalled, etc.), information regarding the driving ability of a driver of the target vehicle (e.g., erratic driving, dangerous, driving, courteous driving, safe driving, etc.), or any other similar information about the target vehicle. In several embodiments, the processor 624 of the recipient determination module 620 analyzes the target vehicle status information received by the vehicle identification module 114 of the vehicle 110 to determine what message the driver and/or a passenger of the vehicle 110 included about the vehicle 120. In several non-limiting examples, as discussed above, the message may include a notification that the vehicle 120 is broken down on the side of the road, a notification that a tail light of the vehicle 120 is out, a notification that the driver of the vehicle 120 is driving well, a notification that the driver of the vehicle 120 is driving recklessly, or any other similar notification. In several examples, the processor 624 of the recipient determination module 620 analyzes the target vehicle status information and uses a rule-based algorithm to determine which one or more target information recipients 170 (see FIG. 1) should receive the target vehicle status information. Therefore, in several examples, the processor 624 determines/identifies a target information recipient 170.

In several embodiments, the processor 624 uses a language-based interpretation algorithm to determine the content of the message. In alternative embodiments, the language-based interpretation algorithm may be included in the user input processing module 117 of the vehicle identification module 114. In such embodiments, the vehicle identification module 114 may transmit the processed message to the server 150. In other embodiments, both the processor 624 and the user input processing module 117 may each use a language-based interpretation algorithm to determine the content of the message. In further embodiments, the processor 624 may use a combination of the rule-based algorithm and the language-based interpretation algorithm to determine the content of the message.

As discussed above with respect to step 570 in FIG. 5, in several alternative embodiments, at the step 570 during or after analyzing the first data set, a notification signal is transmitted to the target information recipient. In several embodiments, the notification signal is transmitted by the transmitter 628 of the recipient determination module 620. In several embodiments, based on the content of the target vehicle status information, the processor 624 sends a notification signal to at least one recipient in the recipient database 626. In various examples, the notification signal may include the content of the target vehicle status information received from the vehicle identification module 114. In other examples, the notification signal may simply include the location of the vehicle 120, for example, and a notification instructing the recipient(s) to go to the location of the vehicle 120.

In one example that is not intended to be limiting, the target vehicle status information received from the vehicle identification module 114 includes a statement from the driver of the vehicle 110 that the vehicle 120 is on fire on the side of the road. In this example, the processor 624 of the recipient determination module 620 may determine that a notification signal should be sent to an ambulance (e.g., the ambulance 326*a*), a fire truck (e.g., the fire truck 326*b*), a police car (e.g., the police car 326*c*), a hospital (e.g., the hospital 326*0*, and an emergency contact of the driver of the vehicle 120 (e.g., the emergency contact 326*g*).

In another example that is not intended to be limiting, the target vehicle status information received from the vehicle identification module 114 includes a statement from the driver of the vehicle 110 that the driver of the vehicle 120 is driving well and in a safe manner. In examples where the vehicle 120 is a fleet vehicle, the processor 624 of the recipient determination module 620 may determine that a notification signal should be sent to a fleet vehicle operations facility (e.g., the fleet vehicle operations facility 326*d*).

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DB ase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described systems, methods, and/or any combination thereof. In several embodiments, such a processor may include one or more of any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes, and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the borrower not to invoke 35 U.S.C. § 112, paragraph 6 for any limitations of any of the claims herein, except for those in which the claim expressly uses the word "means" together with an associated function.

What is claimed is:

1. A system for tagging a vehicle, comprising:
   a vehicle comprising a vehicle identification module, the vehicle identification module comprising a user input processing module configured to receive an initiation communication comprising a data set that includes both target vehicle identifying data and target vehicle status information, wherein the target vehicle status information includes at least an operative defect of a target vehicle;
   a vehicle location database comprising identification information of a plurality of potential target vehicles; and
   a server comprising:
   a server validation module configured to:
   receive the data set from a transmitter of the vehicle identification module;
   interrogate the vehicle location database for the identification information of the plurality of potential target vehicles; and
   identify the target vehicle of the plurality of potential target vehicles in the vehicle location database based on the target vehicle identifying data; and
   a recipient determination module configured to:
   analyze the target vehicle status information to determine at least one target information recipient; and
   transmit a notification signal to the at least one target information recipient.

2. The system of claim 1, wherein the identification information of the plurality of potential target vehicles in the vehicle location database comprises:
   a location of at least one vehicle of the plurality of potential target vehicles; and
   a timestamp indicating a time when the identification information for at least one potential target vehicle of the plurality of potential target vehicles was received by the vehicle location database.

3. The system of claim 1, wherein the target vehicle identifying data comprises at least one of a color of the target vehicle, a make of the target vehicle, a model of the target vehicle, a type of the target vehicle, a license plate number of the target vehicle, a bumper sticker of the target vehicle, or a decal of the target vehicle.

4. The system of claim 1, wherein the vehicle further comprises a vehicle sensor comprising at least one camera positioned on the vehicle, wherein the at least one camera is configured to capture at least one image of an exterior environment surrounding the vehicle.

5. The system of claim 4, wherein the vehicle identification module further comprises a sensor processing module comprising an image processor, the image processor being configured to analyze the at least one image of the exterior environment.

6. The system of claim 1, wherein the server validation module further comprises a memory configured to store historical identification information, wherein the historical identification information comprises identification information of the target vehicle captured by a vehicle sensor.

7. The system of claim 1, further comprising a second vehicle configured to transmit identification information of itself to the vehicle location database for storage as identification information for at least one potential target vehicle, wherein the plurality of potential target vehicles comprises the second vehicle.

8. The system of claim 7, wherein the identification information of the second vehicle comprises a location of the target vehicle.

9. The system of claim 8, wherein the server validation module is further configured to validate the data set by comparing the target vehicle identifying data of the data set with the identification information of the plurality of potential target vehicles received from the vehicle location database in order to determine a match between the target vehicle identifying data received in the data set and the second vehicle.

10. The system of claim 9, wherein:
   the server validation module further comprises a memory configured to store historical identification information, and
   the validating the data set comprises parsing the historical identification information to confirm the match between the target vehicle identifying data received in the data set and the second vehicle.

11. A system for tagging a vehicle, comprising:
a vehicle comprising:
a user input processing module configured to receive an initiation communication comprising a first data set including target vehicle identifying data and target vehicle status information, wherein the target vehicle status information includes at least an operative defect of a target vehicle;
a vehicle location database comprising identification information of a plurality of potential target vehicles; and
a server comprising:
a server validation module configured to:
receive the identification information of the plurality of potential target vehicles in the vehicle location database; and
identify the target vehicle of the plurality of potential target vehicles, wherein the target vehicle is associated with the first data set;
validate the first data set by comparing the target vehicle identifying data received in the first data set with identification information of the target vehicle received from the vehicle location database; and
a recipient determination module configured to:
analyze the first data set to determine at least one target information recipient; and
transmit a notification signal to the at least one target information recipient.

12. The system of claim 11, further comprising a second vehicle comprising a second user input processing module configured to receive a second initiation communication comprising a second data set including identification information of the target vehicle.

13. The system of claim 12, wherein the server validation module is further configured to validate the first data set by comparing the target vehicle identification information received in the first data set with target vehicle identification information received in the second data set in order to determine a match.

14. The system of claim 11, wherein the identification information of the plurality of potential target vehicles in the vehicle location database comprises:
a location of at least one vehicle of the plurality of potential target vehicles; and
a timestamp indicating a time when the identification information for at least one vehicle of the plurality of potential target vehicles was received by the vehicle location database.

15. The system of claim 11, wherein the target vehicle identifying data comprises at least one of a color of the target vehicle, a make of the target vehicle, a model of the target vehicle, a type of the target vehicle, a license plate number of the target vehicle, a bumper sticker of the target vehicle, or a decal of the target vehicle.

16. The system of claim 11, wherein:
the vehicle further comprises a vehicle sensor comprising at least one camera configured to capture at least one image of an exterior environment surrounding the vehicle, and
the server validation module further comprises a memory configured to store historical identification information comprising identification information of the target vehicle captured by the vehicle sensor.

17. A method for tagging a vehicle, comprising:
receiving, at a user interface of a vehicle, an initiation communication comprising a first data set that includes both target vehicle identifying data and target vehicle status information, wherein the target vehicle status information includes at least an operative defect of a target vehicle;
transmitting the first data set to a server validation module of a server;
interrogating, by the server validation module, a vehicle location database comprising identification information of a plurality of potential target vehicles;
identifying, by the server validation module, the target vehicle of the plurality of potential target vehicles, wherein the target vehicle is associated with the first data set;
based on the first data set, determining at least one target information recipient of a plurality of target information recipients for sending a communication based on the target vehicle status information; and
transmitting, by a recipient determination module, a notification signal to the at least one target information recipient.

18. The method of claim 17, wherein receiving the identification information of the plurality of potential target vehicles comprises:
receiving a location of at least one vehicle of the plurality of potential target vehicles; and
receiving a timestamp indicating a time when the identification information for at least one vehicle of the plurality of potential target vehicles was received by the vehicle location database.

19. The method of claim 17, further comprising:
capturing, by a vehicle sensor of the vehicle, at least one image of an exterior environment surrounding the vehicle; and
storing, by a memory of the server validation module, historical identification information, wherein the historical identification information comprises identification information of the target vehicle captured by a vehicle sensor.

20. The method of claim 19, further comprising:
validating, by the server validation module, the first data set by comparing identification information of the target vehicle received in the first data set with the identification information of the target vehicle received from the vehicle location database in order to determine a match,
wherein the validating the first data set comprises:
parsing the historical identification information to confirm the match between the identification information of the target vehicle received in the first data set and the identification information of the target vehicle received from the vehicle location database.

* * * * *